(12) United States Patent
Chou et al.

(10) Patent No.: US 9,248,515 B2
(45) Date of Patent: Feb. 2, 2016

(54) WHEEL RIM PROCESSING MACHINE

(71) Applicant: Factory Automation Technology CO., LTD., Chiayi County (TW)

(72) Inventors: Chun Chien Chou, Chiayi County (TW); Po Cheng Su, Chiayi County (TW)

(73) Assignee: Factory Automation Technology Co., LTD., Chiayi County (TW)

( * ) Notice: Subject to any disclaimer, the term of this patent is extended or adjusted under 35 U.S.C. 154(b) by 308 days.

(21) Appl. No.: 13/846,669

(22) Filed: Mar. 18, 2013

(65) Prior Publication Data

US 2014/0271016 A1   Sep. 18, 2014

(51) Int. Cl.

| | |
|---|---|
| *B23C 3/00* | (2006.01) |
| *B23B 31/18* | (2006.01) |
| *B23B 31/19* | (2006.01) |
| *B23Q 1/54* | (2006.01) |
| *B21D 53/30* | (2006.01) |

(52) U.S. Cl.
CPC ............... *B23C 3/00* (2013.01); *B23B 31/185* (2013.01); *B23B 31/19* (2013.01); *B21D 53/30* (2013.01); *B23B 2215/08* (2013.01); *B23B 2260/02* (2013.01); *B23C 2215/085* (2013.01); *B23Q 1/5406* (2013.01); *Y10T 409/30896* (2015.01); *Y10T 409/305824* (2015.01)

(58) Field of Classification Search
CPC .... B23B 31/185; B23B 2215/08; B23C 1/14; B23Q 1/54; B23Q 1/5406; Y10T 408/5614; Y10T 408/5616; Y10T 409/3056; Y10T 709/305656; Y10T 409/308792; Y10T 409/30896

USPC .................. 409/164, 165, 168, 198, 221, 224; 408/89, 90; 157/16

See application file for complete search history.

(56) References Cited

U.S. PATENT DOCUMENTS

| | | | | |
|---|---|---|---|---|
| 3,998,127 | A | * | 12/1976 | Romeu .......................... 409/225 |
| 4,866,834 | A | * | 9/1989 | Winkler et al. ..................... 483/1 |
| 5,503,508 | A | * | 4/1996 | Amiguet et al. .............. 408/1 R |
| 5,848,795 | A | * | 12/1998 | Masatsugu et al. ........... 279/137 |
| 6,364,300 | B1 | * | 4/2002 | Kita ................................. 269/32 |
| 6,862,785 | B2 | * | 3/2005 | Baumgartner ................ 29/26 A |
| 7,204,493 | B1 | * | 4/2007 | Gatton .......................... 279/106 |
| 7,703,206 | B1 | * | 4/2010 | Gatton ........................... 29/894 |
| 8,172,489 | B2 | * | 5/2012 | Prust et al. .................... 408/132 |
| 2007/0273108 | A1 | * | 11/2007 | Kitatsuru et al. ............. 279/106 |
| 2007/0284833 | A1 | * | 12/2007 | Lu et al. ........................ 279/106 |
| 2012/0266783 | A1 | * | 10/2012 | Yoshida ............................ 108/2 |

* cited by examiner

*Primary Examiner* — Sunil K Singh
*Assistant Examiner* — Michael Vitale
(74) *Attorney, Agent, or Firm* — Raymond Y. Chan; David and Raymond Patent Firm

(57) ABSTRACT

A wheel rim processing machine which includes an oscillating table rotation base. A workbench is provided on an extending section of the oscillating table rotation base. A power source is provided on the work bench. A connecting element is connected to the workbench for connecting a power cylinder provided at a bottom side thereof and a plurality of gripping jaws lined with a griping jaw arrangement at a top side thereof. The connecting element is provided with an outer gear. The retaining arrangement on the connecting element has a connecting rod shaft element which is penetratedly fastened to the gripping jaw arrangement via pin elements. A block, which is provided below the connecting element at an inner side thereof, is connected to a pivot connecting element connected which retains the power cylinder below the connecting element via at least one screw element.

3 Claims, 8 Drawing Sheets

WHEEL RIM PROCESSING MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a wheel rim processing machine.

2. Description of Related Arts

Wheel rims are more or less indispensable components in the car industry. The wheel rims, whatever the size, play an important role and have been widely used in a car configuration.

A manufacturing process of a wheel rim mainly comprises the plurality of steps including a 1st Operation (OP1), a Pitch Circle Diameter (PCD), and a 2nd Operation (OP2), so as to process the raw materials of a wheel rim into a wheel rim with a desired rim pattern, as described in Taiwan patent I369301.

Referring to FIG. 8 of the drawings, in the manufacturing process of a conventional truck wheel rim 82, in order to obtain surface heat dissipating holes 83 with an incline angle of 15 to 45 degrees of the wheel rim 82, aiding equipment tool 8 with gripping jaws is employed to retain the wheel rim 82 in position. The wheel rim 82 is then adjusted to a position with a desired processing angle through the manual rotation of an operator, so that the heat dissipating holes 83 of the wheel rims 82 are formed in a milling process through the rotation of the tool 8 with the cooperation of a lathe. Therefore, the manufacturing procedures become more complex and the manufacturing costs are increased.

In a processing machine disclosed in Japanese patent publication 2007-176016 and US patent publication US2006270540, a work piece to be processed is milled into a finished product by means of shifting the axial angles of an oscillating table rotation base B of a machine body, together with multidirectional movements along X-axis, Y-axis, C-axis, and Z-axis. However, a wheel rim is not easy to be firmly held in position via this type of processing machine.

In view of the above disadvantages, combined with many years researching, designing, and practical manufacturing experiences in the related industry; a wheel rim processing machine developed for overcoming the disadvantages of the conventional structure is provided by the inventor herein in an aim of obtaining more practical utility value.

SUMMARY OF THE PRESENT INVENTION

A main object of the present invention is to provide a wheel rim processing machine, wherein a gripping jaw arrangement and a power cylinder are provided on a oscillating table rotation base for overcoming the disadvantage that a conventional lathe is unable to simultaneously produce the wheel rim heat dissipating holes with an inclination angle of 15 to 45 degree while producing the PCD holes and valve holes.

Additional advantages and features of the invention will become apparent from the description which follows, and may be realized by means of the instrumentalities and combinations particular point out in the appended claims.

According to the present invention, the foregoing and other objects and advantages are attained by a wheel rim processing machine comprising: a main spindle cutter arrangement, a machine base, an oscillating table rotation base provided on the machine base, a first power source provided at a pivot joint of the oscillating table rotation base and the machine base, a workbench provided on an extending section of the oscillating table rotation base, a second power source provided on the work bench, a connecting element connected to the workbench, a power cylinder provided below the connecting element, a griping jaw arrangement linked with a plurality of gripping jaws provided above the connecting element wherein the connecting element is connected to the power cylinder and the plurality of gripping jaws linked to the gripping jaw arrangement, an outer gear connected to the connecting element which is connected to the workbench, a retaining arrangement connected to the connecting element wherein the retaining arrangement comprises a connecting rod shaft element and at least one pin element penetratedly fastened to the connecting rod shaft element to the gripping jaw arrangement, a block provided below the inner side of the connecting element thereof, and a pivot connecting element connected to the block wherein the pivot connecting element retains the power cylinder below the connecting element via at least one screw element.

The object and efficacy of the wheel rim processing machine of the present invention can be achieved by the following technology.

The wheel rim processing machine comprises an oscillating table rotation base which is provided with the gripping jaw arrangement to cooperate with the driving motion of the power cylinder so that the gripping jaws of the gripping jaw arrangement can firmly retain the wheel rim on the workbench. The second power source, respectively provided on the wheel rim processing machine, activates an axial angle shift of the oscillating table rotation base as well as the rotation of gripping jaw arrangement on the workbench, the valves holes, PCD holes, and heat dissipating holes with an inclination angle of 15 to 45 degree of the wheel rim which are manufactured by the main spindle cutter arrangement provided on the wheel rim processing machine. The design of the wheel rim processing machine of the present invention enables multiple processing steps on the same wheel rim processing machine, thus the efficiency of the manufacturing process of the wheel rim is increased.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
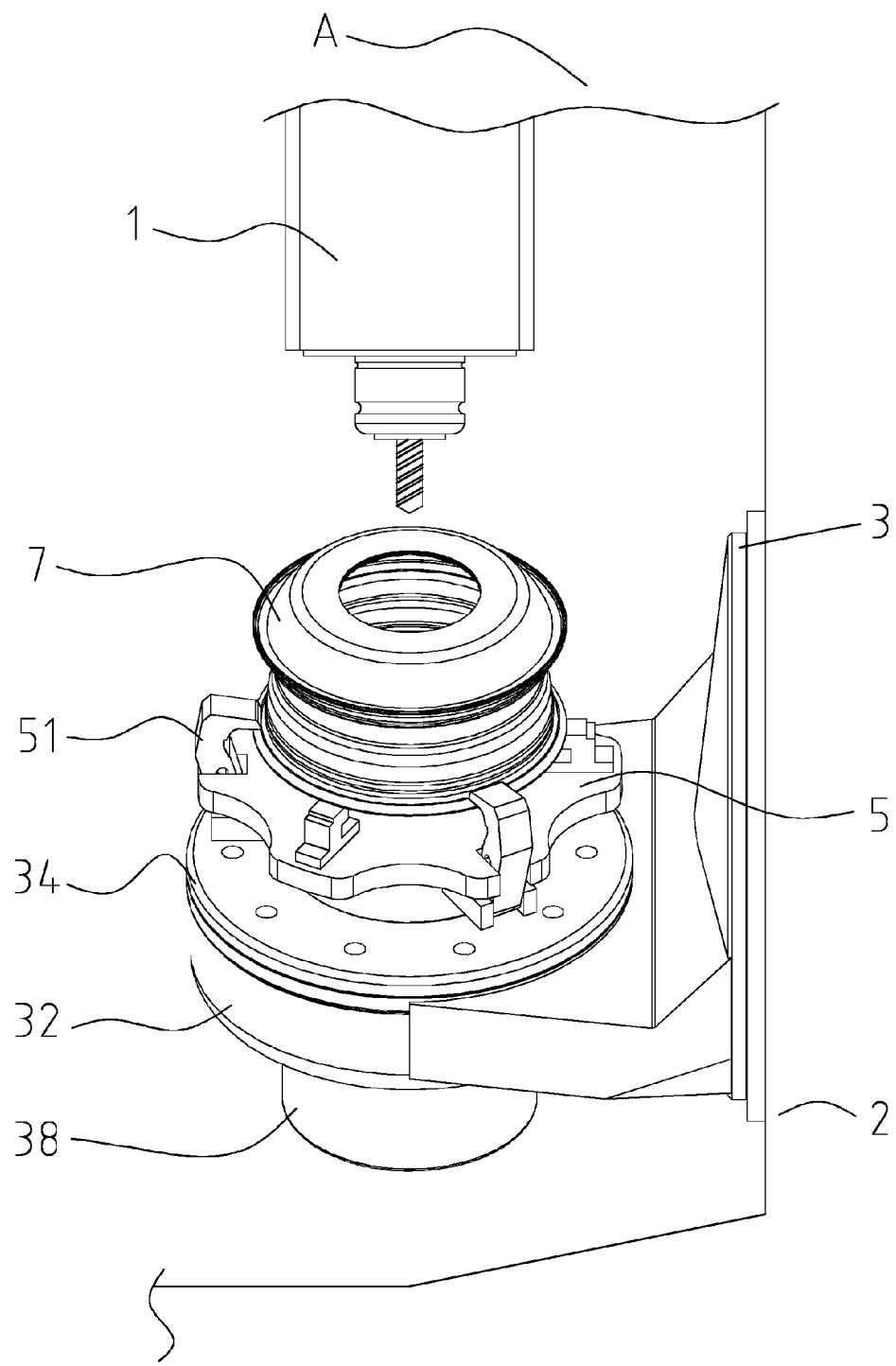
FIG. 1 is a schematic view illustrating a general appearance of the wheel rim processing machine according to a preferred embodiment of the present invention.
Figure 2:
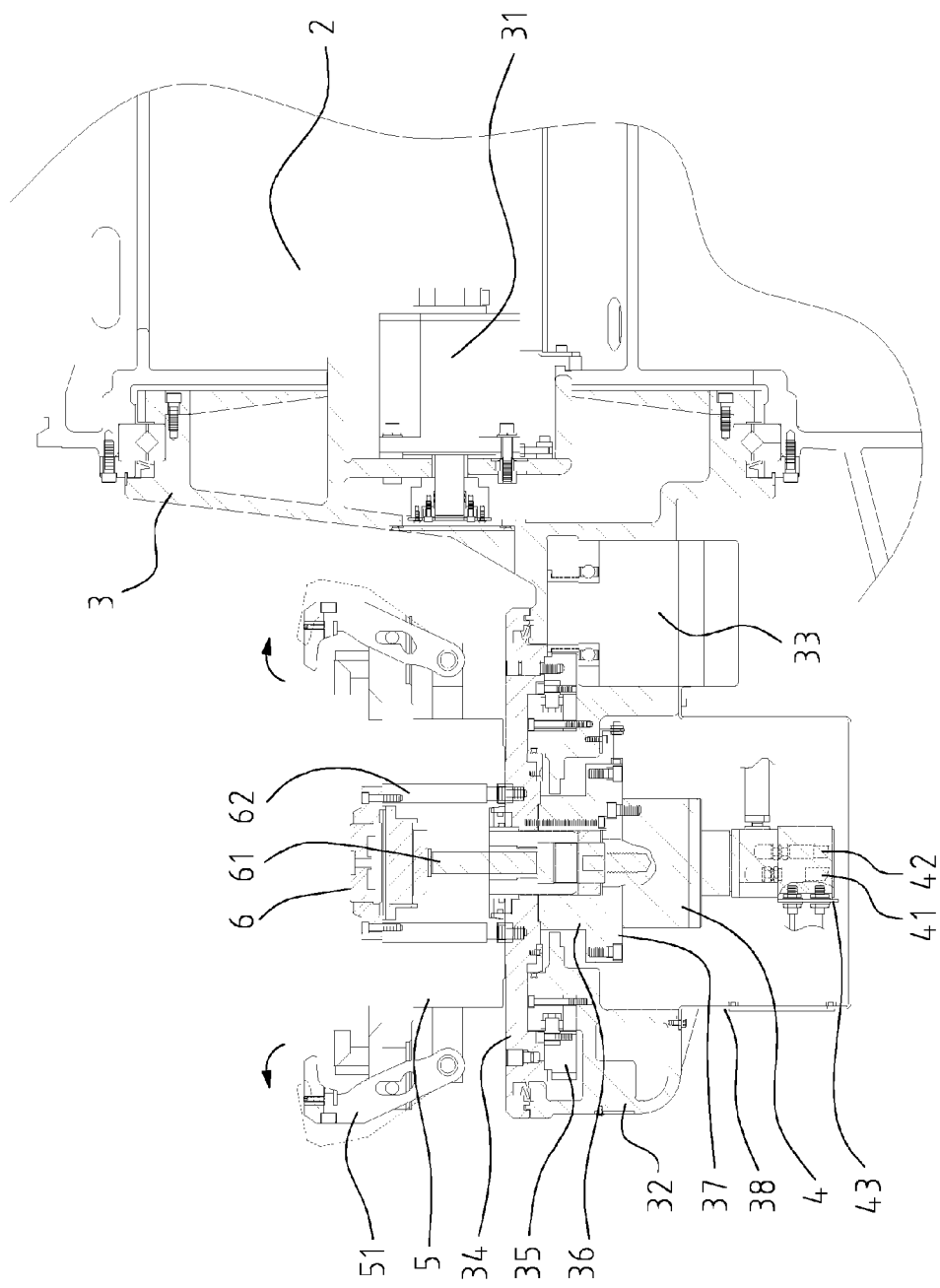
FIG. 2 is a sectional view of the wheel rim processing machine according to the above preferred embodiment of the present invention.

Referring to FIGS. 1 and 2 of the drawings, FIG. 1 is a schematic view illustrating a general appearance of a wheel rim processing machine according to a preferred embodiment of the present invention, and FIG. 2 is a sectional view of the wheel rim processing machine. As shown in the drawings, a wheel rim processing machine A comprises a main spindle cutter arrangement 1 and a machine base 2. The machine base 2 is provided with an oscillating table rotation base 3. A pivot joint of the oscillating table rotation base 3 and the machine base 2 is provided with a first power source 31. A workbench 32, which is provided on an extending section of the oscillating table rotation base 3, is provided with a second power source 33. A connecting element 34, which is provided on the workbench 32, is connected to a power cylinder 4 at a bottom side thereof and a plurality of gripping jaws 51 linked to a griping paw arrangement 5 at a top side thereof.

The second power source 33 of the workbench 32 can be programmably controlled to activate an outer gear 35 which is rotatably and pivotally provided on the connecting element 34. A retaining arrangement 6, which is connected to the connecting element 34, comprises a connecting rod shaft element 61 which is penetratedly fixed to the griping jaw arrangement 5 via a plurality of pin elements 62. A block 36, which is provided at an inner side below the connecting element 34, is connected to a pivot connecting element 37. The pivot connecting element 37 retains the power cylinder 44 (such as a rotary hydraulic cylinder or a rotary pneumatic cylinder) at a bottom side thereof in position via a plurality of screw elements. A housing 38, which is provided at an outer side of the power cylinder 4, covers the power cylinder 4 and is fixed to a lower edge of the workbench 32. The connecting element 34, which is provided on the workbench 32, is connected to the power cylinder 4 at a bottom side thereof and the griping jaw arrangement 5 at a top side thereof. The connecting rod shaft element 61 comprises an outer thread end which is locked and fixed on the power cylinder 4. The connecting rod shaft element 61 of the retaining arrangement 6 is correspondingly connected to the power cylinder 4 at a bottom side thereof and the griping jaw arrangement 5 at a top side thereof. An upward and downward reciprocating movement of the power cylinder 4 drives the gripping jaws 51 of the gripping jaw arrangement 5 to perform gripping or releasing actions so as to firmly grip or release the wheel rim.

Figure 3:
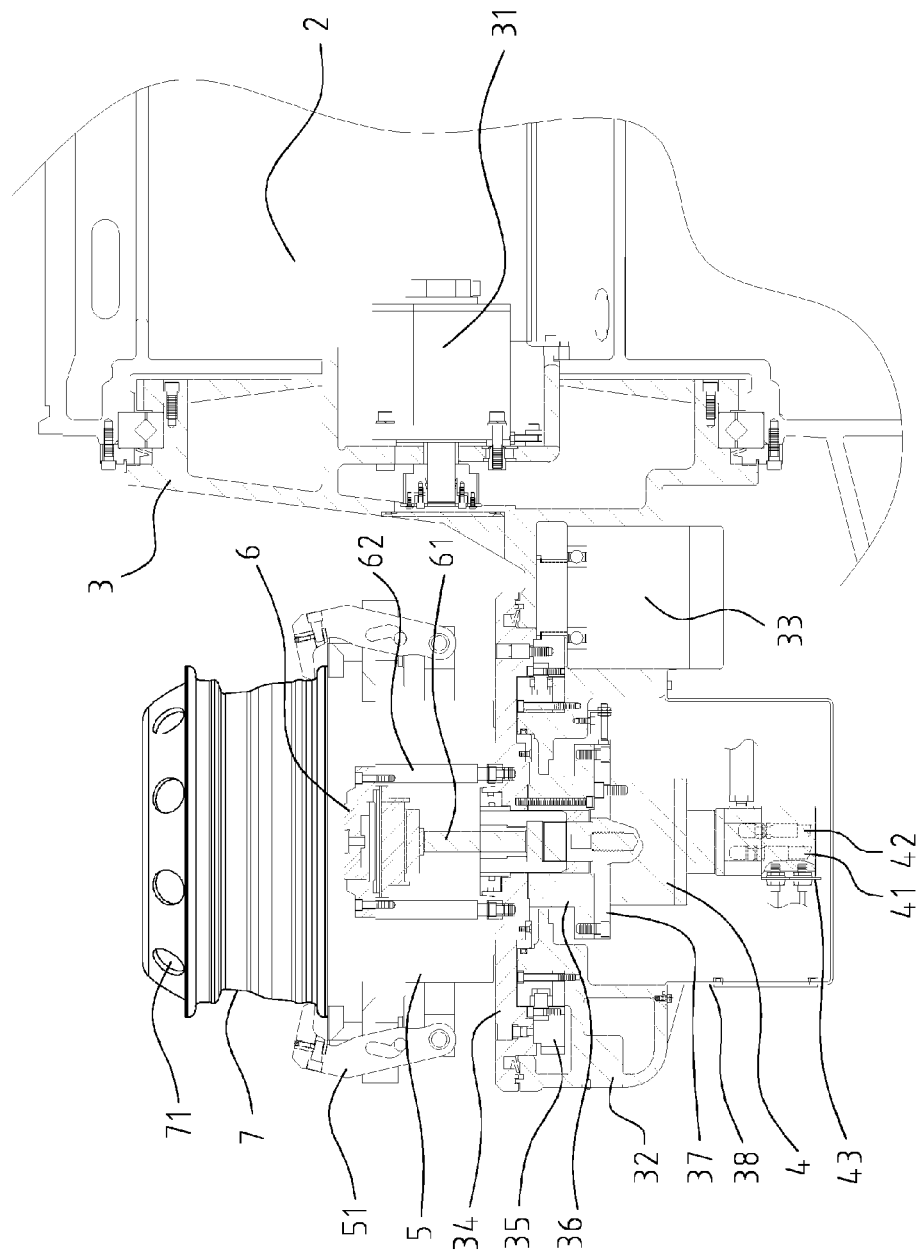
FIG. 3 is a sectional view illustrating a wheel rim being firmly held in position according to the above preferred embodiment of the present invention.

FIG. 3 is a sectional view illustrating a wheel rim being firmly held in position according to the above preferred embodiment of the present invention. The power cylinder 4 below the workbench 32 and the connecting element 23 is provided with a first pipeline 41 and a second pipeline 42. When the first pipeline 41 is filled with motion propulsion pressure, the connecting rod shaft element 61 connected to the power cylinder 4, and together with the correspondingly gripping jaw arrangement 5 moves downward so that the gripping jaws 51 firmly and inwardly fastens a lower edge of the wheel rim. On the other hand, in order to release the wheel rim, the second pipeline 42 is filled with propulsion pressure, so that the connecting rod shaft element 61 connected to the power cylinder 4 together with the correspondingly gripping jaw arrangement 5 moves upward to outwardly release the gripping jaws 51, and thus the lower edge of the wheel rim is released.

Figure 4:
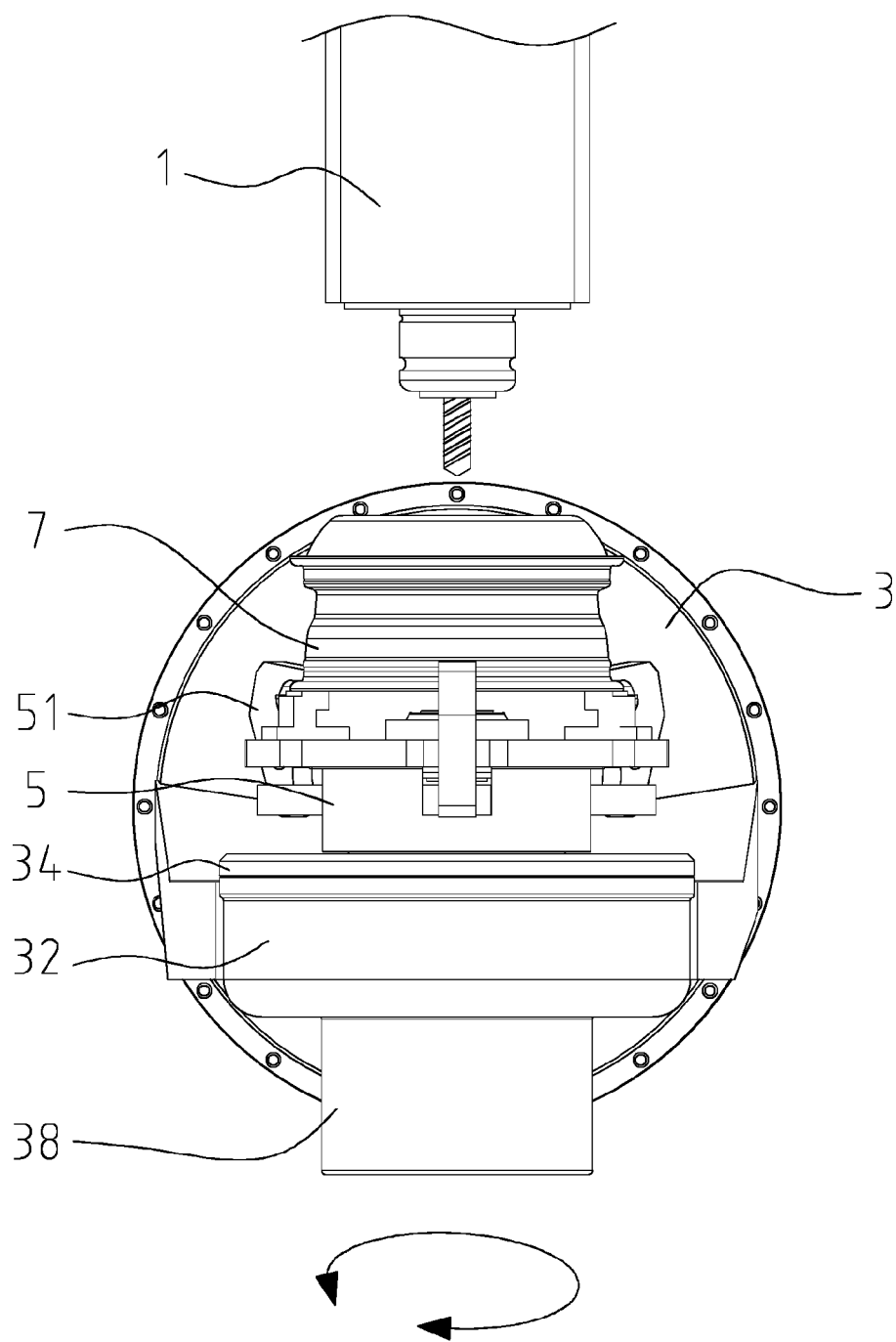
FIG. 4 is a side view illustrating a manufacturing process of PCD holes according to the above preferred embodiment of the present invention.

FIG. 4 is a lateral view illustrating a manufacturing process of PCD holes 72 in a disk face of a wheel rim (truck wheel rim) using the wheel rim processing machine of the present invention. The second power source 33 on the workbench 32 drives the outer gear 23 to be embedded and fixed to the connecting element 34. The wheel rim 7 which is gripped by the gripping jaw arrangement 5 provided on the connecting element 34 is then rotated in such a way that the PCD holes of the wheel rim are manufactured through the main spindle cutter arrangement 1 of the wheel rim processing machine A.

Figure 5:
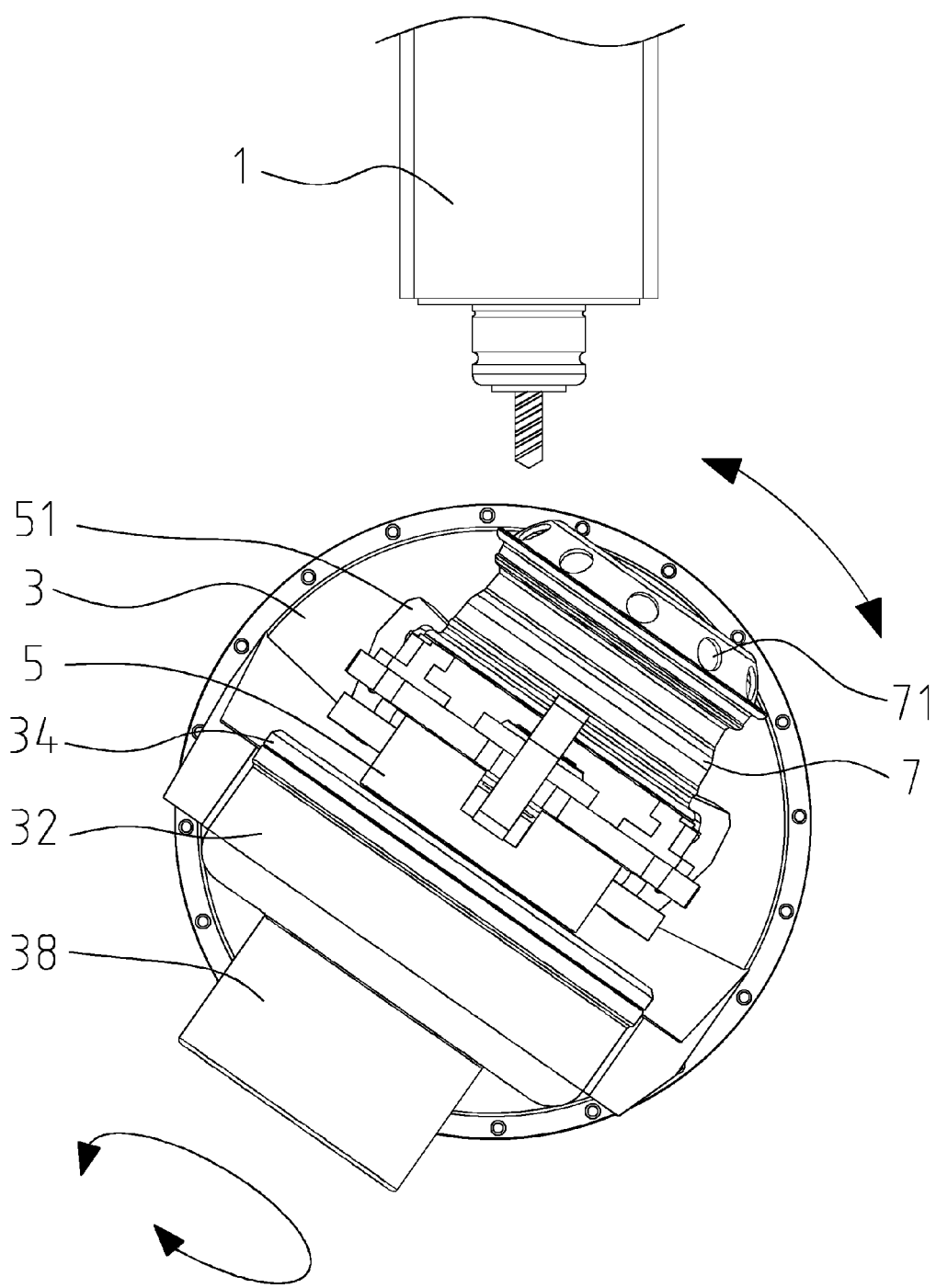
FIG. 5 is a side view illustrating a manufacturing process of heat dissipating holes with inclination angles according to the above preferred embodiment of the present invention.
Figure 6:
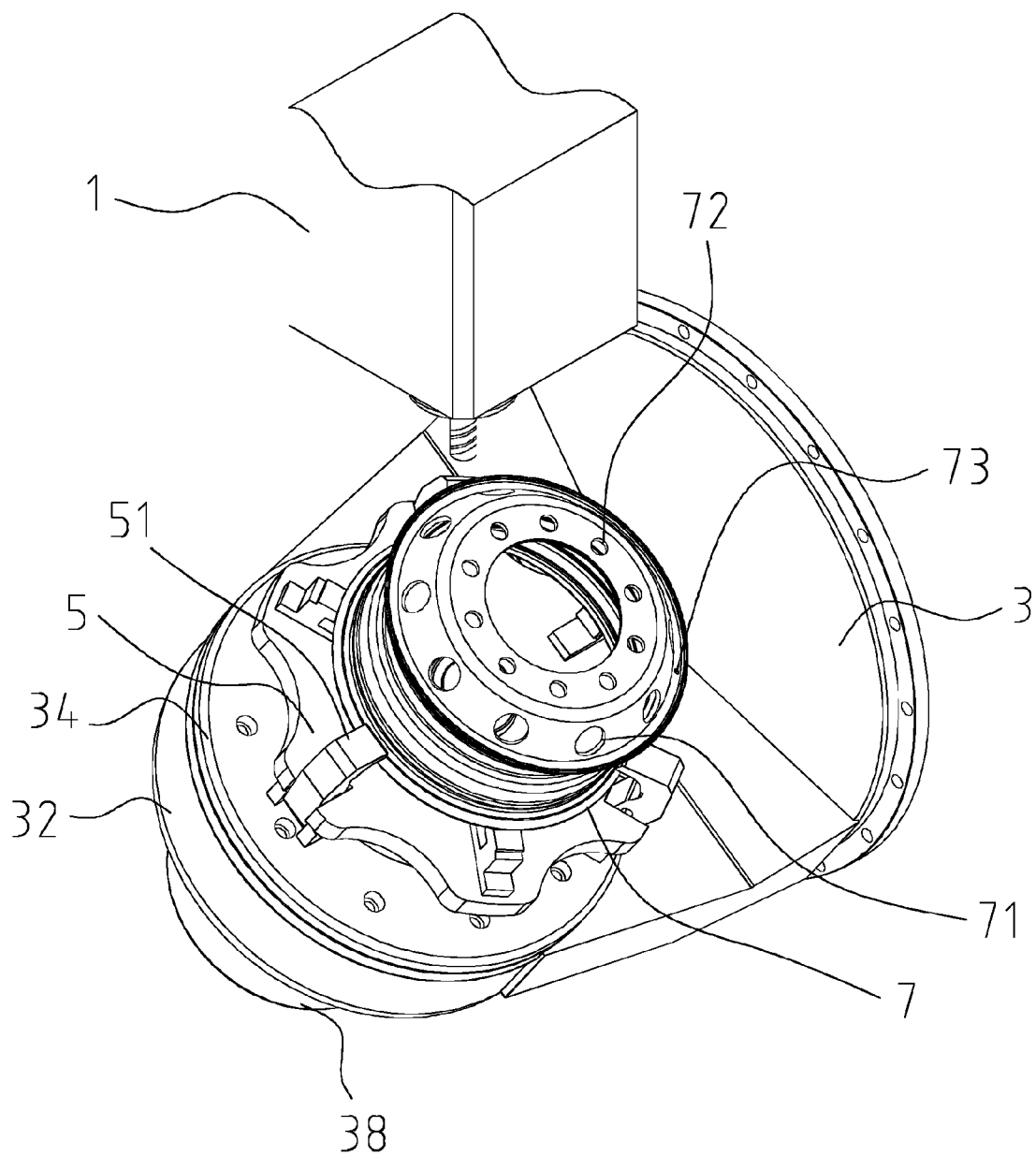
FIG. 6 is a schematic view illustrating the wheel rim having finished the manufacturing process according to the above preferred embodiment of the present invention.

FIGS. 5 and 6 are schematic views which respectively illustrate the manufacturing processes of valve holes 73 (of truck wheel rim) and heat dissipating holes 71 by rotating the oscillating table rotation base 3 with an inclination angle from 15 to 45 degrees using the wheel rim processing machine of the present invention. When the heat dissipating holes 71 of the wheel rim 7 are going to be manufactured, the first power source 3,1 correspondingly provided for the machine base 2 of the wheel rim processing machine A, and the oscillating table rotation base 3 are configured by the wheel rim processing machine A in such a manner that the oscillating table rotation base 3 can be programmably controlled to be rotated to a processing position with a desired inclination angle of 15 to 45 degrees. Simultaneously, the second power source 33 of the workbench 32 drives the outer gear 35 to rotate so as to drive the connecting element 34 to move, so that the wheel rim 7, which is gripped by the gripping jaw arrangement 5 provided on the connecting element 34, is rotated, and thus the milling process of the valve holes 73 and heat dissipating holes 71 of the wheel rim 7 are carried out in turn by the main spindle cutter arrangement 1. When the manufacturing processes have finished, the second power source 32 of the workbench 32 deactivates so as to stop the rotation of the wheel rim 7, and then the first power source 31 correspondingly provided on the machine base 2 of the wheel rim processing machine A and the oscillating table rotation base 3 drives the oscillating table rotation base 3 to move to a horizontal position. Then the second pipeline 42 of the power cylinder 4 below the workbench 32 is filled with motion propulsion pressure, so that the connecting rod shaft element 61 connected to the power cylinder 4, together with the corresponding gripping jaw arrangement 5 moves upward to outwardly release the gripping jaws 51, and thus the lower edge of the wheel rim is released. Therefore, the manufacturing processes for the valves holes 73, PCD holes 72, and heat dissipating holes 71 with an inclination angle of 15 to 45 degree of the wheel rim 7 using the wheel rim processing machine A of the present invention are completed.

Figure 7:
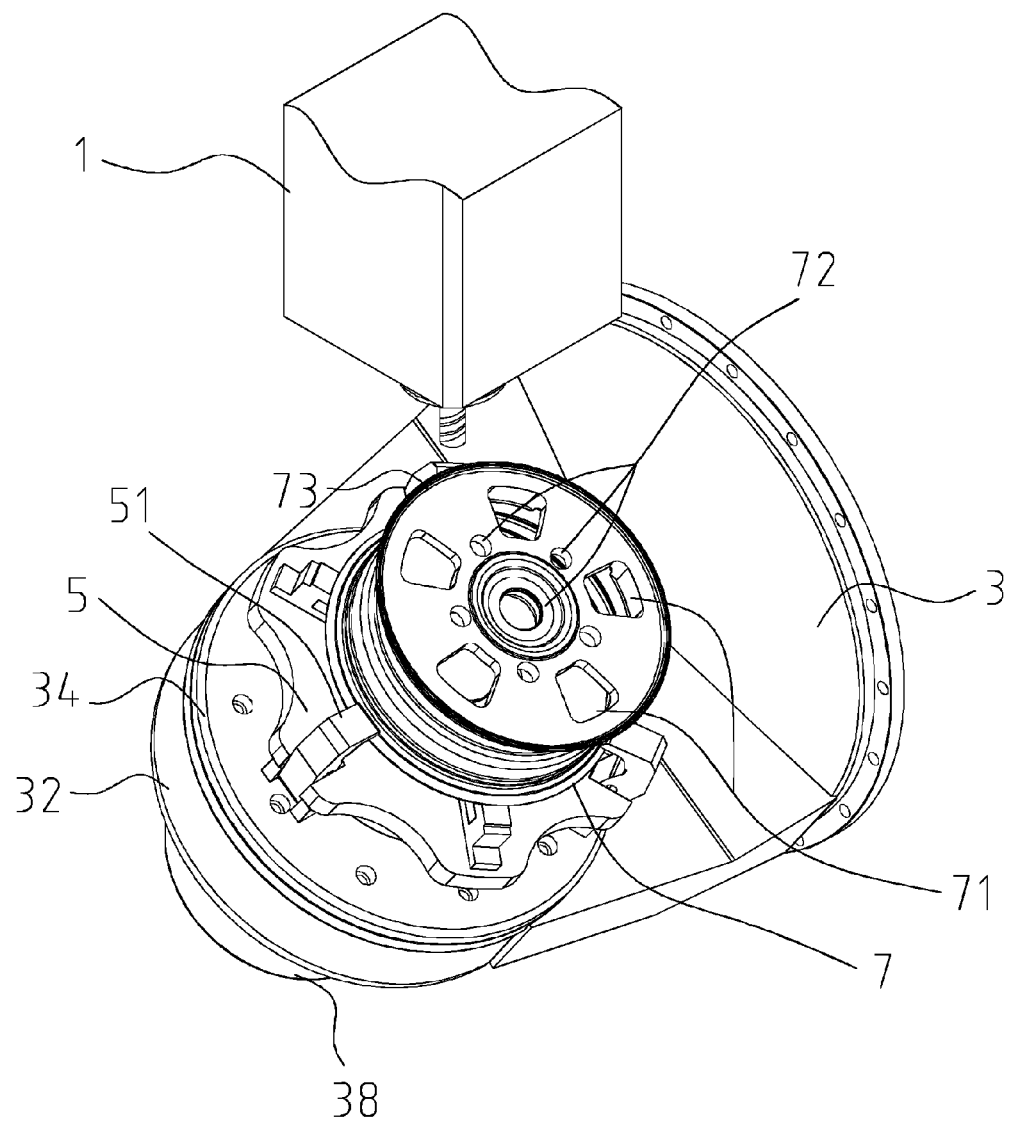
FIG. 7 is a schematic view of a wheel rim processing machine according to another preferred embodiment of the present invention.
Figure 8:
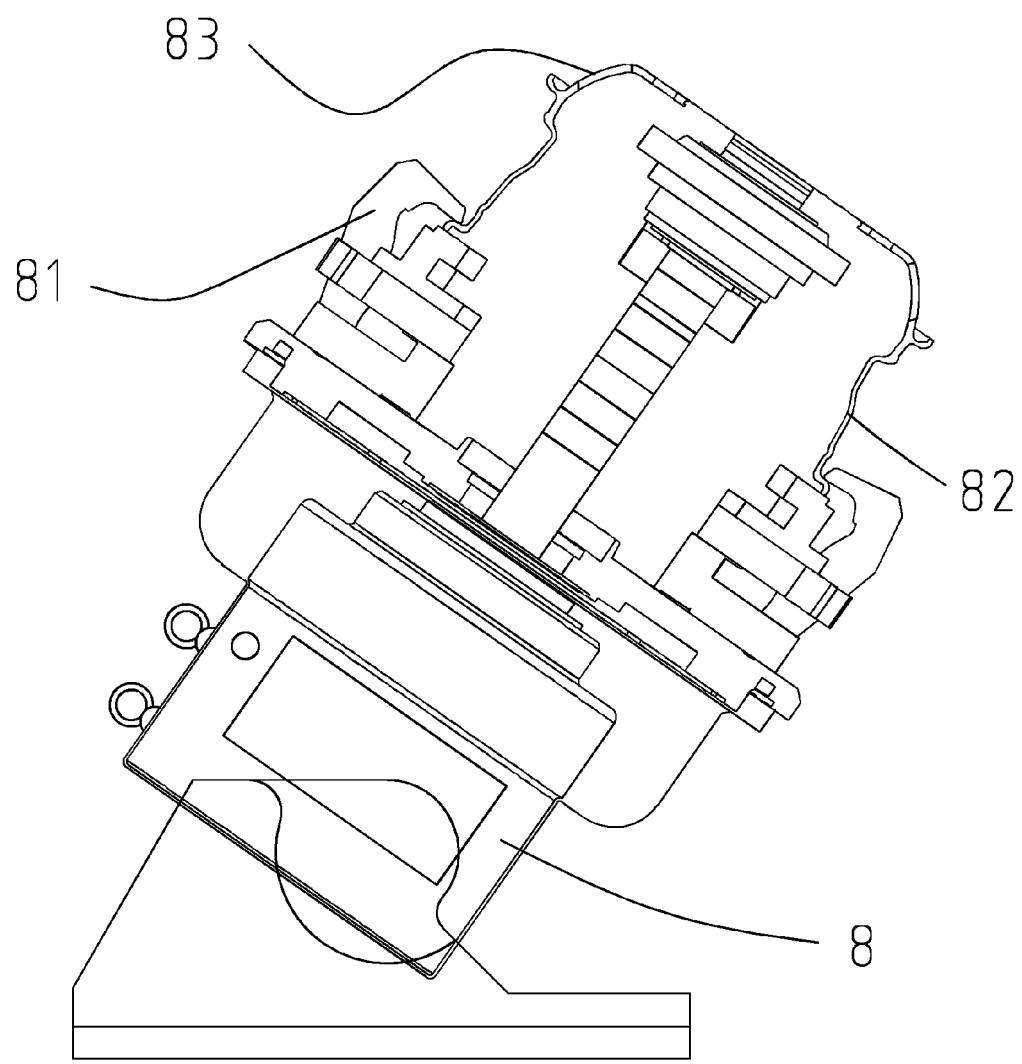
FIG. 8 is a side view illustrating a processing tool for truck wheel rim holes according to a prior art.

FIG. 7 is a schematic view illustrating a typical car wheel rim which has completed the manufacturing process for the valves holes 73, PCD holes 72, and heat dissipating holes 71 with an inclination angle of 15 to 45 degrees.

However, the power cylinder 4 can be provided with a set of advancing switch sensors 43 at a lateral side thereof allowing the wheel rim processing machine A to sense the upward and downward movement of the power cylinder 4, so that the gripping and releasing of the wheel rim 7 can be performed through a programmable control of a control unit of the wheel rim processing machine A.

It is appreciated that the structures and sizes of the above embodiment of the present invention as shown in the drawings and described above are exemplary only, any appropriate alternations and modifications made by a person skilled in the art are encompassed within the spirit and scope of the present invention.

According to the above description, the design of the wheel rim processing machine of the present invention enables multiple processing steps on the same processing machine, and thus the efficiency and accuracy of the manufacturing process of a wheel rim is increased.

The connecting element provided on the workbench enables replacing of gripping jaw arrangement with different wheel gripping diameters so as to meet the requirements of the manufacturing processes of wheel rims with different wheel diameters.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wheel rim processing machine, comprising:
   a main spindle cutter arrangement,
   a machine base,
   an oscillating table rotation base provided on said machine base,
   a first power source provided at a pivot joint of said oscillating table rotation base and said machine base,
   a workbench provided on an extending section of said oscillating table rotation base,
   a second power source provided on said work bench,
   a connecting element connected to said workbench,
   a power cylinder provided below said connecting element,
   a gripping jaw arrangement connected with a plurality of gripping jaws provided above said connecting element, wherein said connecting element is connected to said power cylinder and said plurality of gripping jaws connected to said gripping jaw arrangement,
   an outer gear connected to said connecting element which is connected to said workbench,
   a retaining arrangement connected to said connecting element, wherein said retaining arrangement comprises a connecting rod shaft element and at least one pin element penetratedly fastening said connecting rod shaft element to said gripping jaw arrangement, wherein said connecting rod shaft element is connected to said gripping jaw arrangement at a top side thereof, and is penetrated through said connecting element to connect to said power cylinder at a bottom side thereof,
   a block provided below said connecting element at an inner side thereof, and
   a pivot connecting element connected to said block, wherein at least one screw element connects said pivot connecting element to said power cylinder in such a manner that said pivot connecting element retains said power cylinder below said connecting element.

2. The wheel rim processing machine, as recited in claim 1, further comprising a housing provided at an outer side of said power cylinder, wherein said housing, which covers said power cylinder, is fastened to a lower edge of said workbench.

3. The wheel rim processing machine, as recited in claim 1, further comprising at least one advancing switch sensor provided on said power cylinder.

\* \* \* \* \*